Oct. 27, 1925.
J. G. CHALMERS
APPARATUS FOR CLEANING WHEAT
Filed July 20, 1922
1,558,591
2 Sheets-Sheet 1
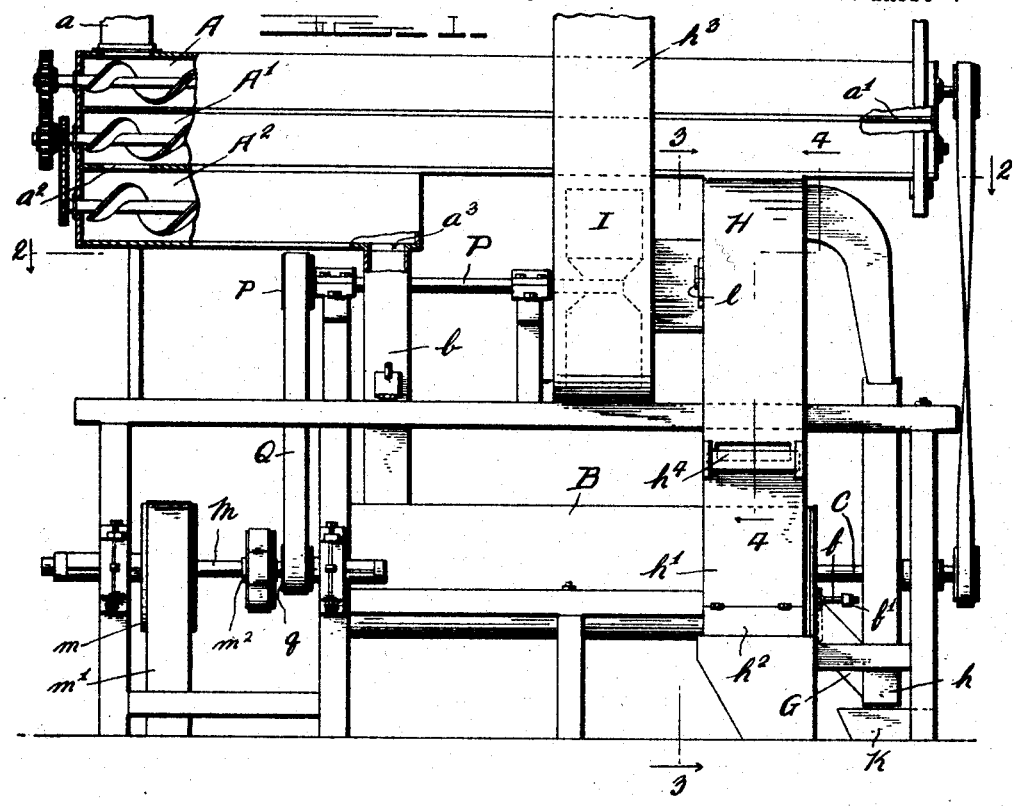
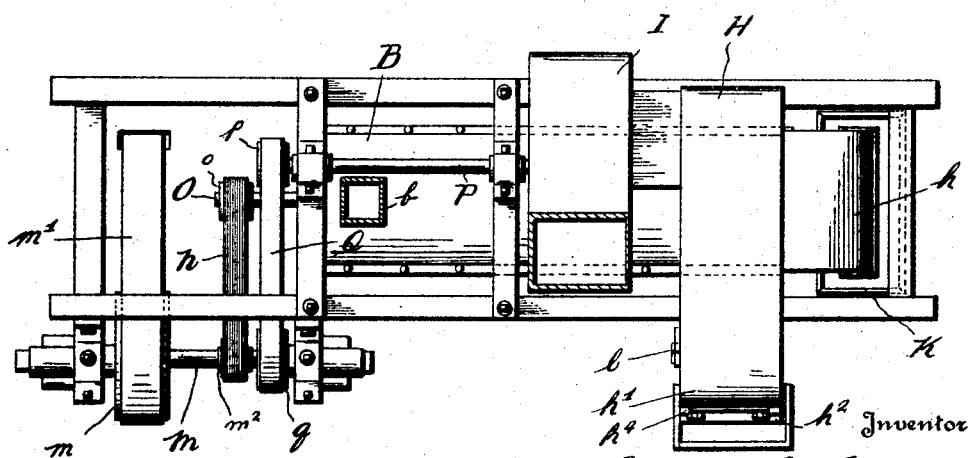
Inventor
James G. Chalmers
By Julian C. Dorell
his Attorney Oct. 27, 1925.  1,558,591
J. G. CHALMERS
APPARATUS FOR CLEANING WHEAT
Filed July 20, 1922  2 Sheets-Sheet 2
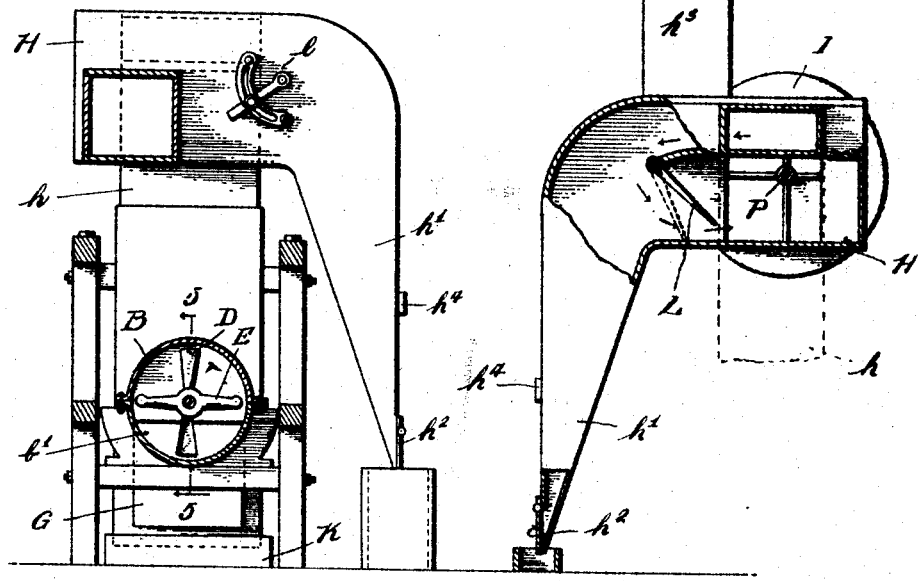
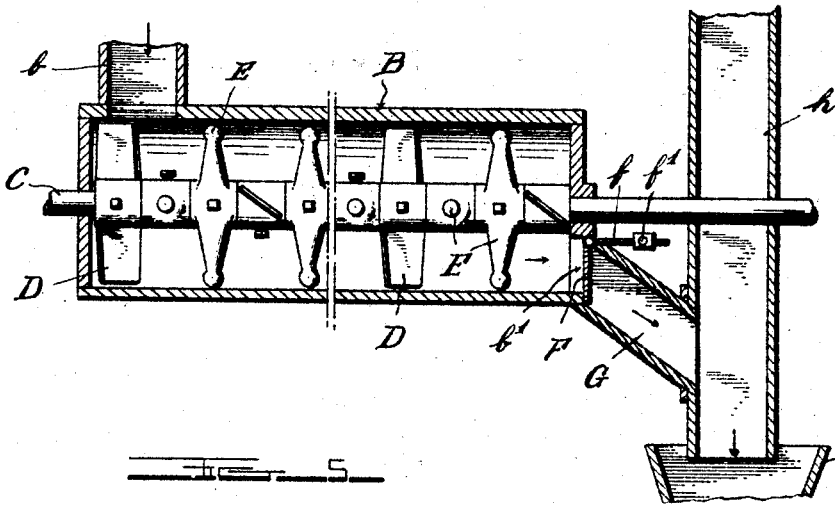
Inventor
James G. Chalmers
By  William C. Dowell
his Attorney Patented Oct. 27, 1925.

1,558,591

UNITED STATES PATENT OFFICE.

JAMES G. CHALMERS, OF MACON, GEORGIA, ASSIGNOR OF ONE-HALF TO MODERN FLOUR MILLS, OF MACON, GEORGIA, A CORPORATION OF GEORGIA.

APPARATUS FOR CLEANING WHEAT.

Application filed July 20, 1922. Serial No. 576,232.

*To all whom it may concern:*

Be it known that I, JAMES G. CHALMERS, a citizen of the Dominion of Canada, residing at Macon, in the county of Bibb and State of Georgia, have invented certain new and useful Improvements in Apparatus for Cleaning Wheat; and I do hereby declare the following to be a full, clear, and exact description of the invention, such as will enable others skilled in the art to which it appertains to make and use the same.

This invention relates to wheat cleaning machines, and has for its object mainly to provide a simple, inexpensive and efficient apparatus or machine of the character referred to, which will clean the wheat by removing the outer coating of bran and all impurities therefrom and separate the same and discharge the wheat in a thoroughly clean condition into a feed hopper or receptacle for delivery to an elevator.

Other objects will appear from the following description.

The invention will first be hereinafter more particularly described, with reference to the accompanying drawings, which are to be taken as a part of this specification, and then pointed out in the claims at the end of the description.

In said drawings, Fig. 1 is a front elevation of a wheat cleaning apparatus embodying my invention;

Fig. 2 is a horizontal sectional view taken on the line 2—2 of Fig. 1;

Fig. 3 is a vertical sectional view taken on the line 3—3 of Fig. 1;

Fig. 4 is a detail sectional view taken on the line 4—4 of Fig. 1; and

Fig. 5 is a fragmentary vertical sectional view of the scourer case and associated parts.

Referring to said drawings, in which the same reference letters are used to denote corresponding parts in different views, the letters A, $A^1$ and $A^2$ denote helical or spiral conveyors, each enclosed in a suitable casing preferably of tubular form through which the wheat passes in a serpentine course to a suitable outlet $a^3$, which leads into a scourer case B, arranged underneath said conveyors. The wheat enters the first conveyor A through an inlet $a$, and is discharged therefrom through an outlet $a^1$ into the next succeeding conveyor $A^1$ through which it passes to an outlet $a^2$ into the next conveyor $A^2$ and from thence it passes to the outlet $a^3$ into and through a pipe or tube $b$ leading to the scourer case B. The scourer case B is preferably of cylindrical form and contains suitable bearings for a horizontal shaft C, which passes longitudinally therethrough, said shaft having fixed thereon carrier flights or blades D and scourer arms E, preferably a series of each, the flights alternating with the scourer arms. The flights are flat and arranged at an angle to the shaft, to adapt them to force the wheat toward the discharge end of the case. The arms E have no conveying tendency, but are adapted to stir up, rub and scour the wheat in such manner as to effectually remove the outer coating of bran and all crease dirt and impurities so that the wheat will be thoroughly cleaned by the time it reaches the discharge opening $b^1$, in the case B, which is kept normally closed by means of a weighted valve or swinging door F, the purpose of which is to retard the flow of wheat from the case in such manner as to produce any desired amount of friction as the wheat is forced toward the discharge end, as may be desirable in treating different kinds of wheat. The swinging door F has formed thereon or secured thereto, co-incident with its pivotal support or hinge, an arm $f$ on which is secured by means of a set screw or other fastening a weight $f^1$, which may be adjusted along the arm $f$ so as to increase or decrease the resistance encountered by the wheat as it reaches the discharge end of the case and bears against said door, through which it passes into a chute G by which it is conducted and discharged by gravity into a draft leg $h$ of an air chamber H, which is in communication with a rotary fan housed in a casing I, as indicated in dotted lines in Fig. 1 of the drawings. After passing through the door F, the wheat slides downwardly and falls into a suitable receptacle or hopper K for delivery to an elevator, (not shown), while the lighter particles of dust and impurities, together with the bran, are separated from the wheat as it enters the draft leg at or near the bottom or lower end thereof, and are drawn upwardly by the fan around and through a valve L, as indicated by the arrows in Fig. 4 of the drawings. The heavier material separated from the wheat and carried upwardly through the draft leg falls by gravity into a depending leg or extension $h^1$ of the fan casing, which is of funnel-like form and constructed with a contracted lower end or screenings tip having a flap valve $h^2$ hinged thereto, which is kept closed by suction until a quantity of screenings accumulate therein of sufficient weight to force the valve open, whereupon the screenings are automatically discharged and the valve again closed by the suction and kept closed until again opened by pressure of the accumulated screenings, and so on, alternately loading and unloading as the process of cleaning wheat proceeds. The valve L opens inwardly in the direction of movement of the current of air, laden with bran and impurities, being pivoted at one end, and may be adjusted by any suitable means such as shown for example, at $l$ Fig. 3, and secured in different positions to increase or decrease the size of the exit from the air chamber or fan case into an outlet pipe $h^3$ leading to a dust collector. Above the swinging tip of the draft leg is placed a slide valve $h^4$ to control the passage of air up through the draft leg, this valve being opened as desired to admit air from the outside, in case the draft is too strong, and vice versa. The letter M denotes the main driving shaft which is provided with a pulley $m$ for applying a belt $m^1$ for driving said shaft from any suitable source of power. It has a gear wheel $m^2$ thereon which may be connected by a Morse silent chain drive N with a pinion $o$ on a counter-shaft O, whereby motion is imparted by said main shaft to said counter-shaft. Motion is also imparted from said main shaft to the fan shaft P by means of a belt Q passing over pulleys $q$ and $p$ on said main shaft and fan shaft, respectively.

In operation, the apparatus being set in motion a small stream of water is introduced in the conveyors and the wheat being fed through the inlet $a$, is caused to pass through the conveyors which mix the wheat and water, giving the water time to penetrate the outer coat of bran, so that it will separate from the inner coat, and as the wet wheat enters the scourer case B, it is subjected to a rubbing action by the scouring arms E and forced by the carrier flights or blades D toward the discharge end of the case and through the door F into the chute G which it enters in a thoroughly cleaned condition, and is discharged by gravity into a suitable receptacle or hopper for delivery to an elevator, while the bran and impurities are separated by suction from the clean wheat and carried upwardly through the draft leg $h$ into and through the air chamber where a separation of the screenings from the air and dust is effected and the screenings caused to fall by gravity into the down leg $h^1$ from which the screenings are discharged, or into a suitable receptacle, while the dust-laden air is forced out into a dust collector. The cone-shaped form of the scouring arms, with enlargements or knobs on their free ends produces a better scouring action than straight arms, having the effect of disturbing the natural order of things in the mass of wheat, breaking up clusters or lumps and rubbing wheat against wheat with a reeling action, without crushing or injuring individual grains, thus effectually removing the outer coating of bran and the impurities, and leaving the wheat in a highly polished state ready for the break rolls. The flights gradually convey the wheat through the scouring cylinder against the pressure of the mass of wheat on the weighted door, the pressure of which may be varied by adjusting the weight so as to increase or decrease the resistance encountered by the cleaned wheat in escaping from the cylinder, thereby increasing or decreasing the frictional contact between the grains of wheat and between the wheat and scouring arms.

It will be understood of course that various changes may be made in the details and arrangement of parts without departing from the spirit and scope of my invention. For example, while the alternate arrangement of carrier flights and scouring arms, substantially as shown in Fig. 5 of the drawings, the flights extending substantially at right angles to adjacent arms on either side, produces a better scouring action than to have them all arranged in a straight row on the shaft, and does better work than a less number of scouring arms, other arrangements and other forms may be employed.

Having thus described my invention, what I claim as new and desire to secure by Letters Patent of the United States is:—

1. A wheat cleaning apparatus, comprising means for dampening and conveying wheat in a serpentine course to a scourer case, said means comprising spiral conveyors enclosed in casings adapted to contain water, and said scourer case having a shaft journaled therein carrying a series of revolving scouring arms and carrier flights between said arms, whereby the outer coating of bran and all crease dirt and impurities are removed from the wheat and the latter forced toward the discharge end of the scourer case in a thoroughly cleaned condition, and means at the discharge end of said scourer-case, including an exhaust fan and associated parts, whereby the bran and impurities are separated from the cleaned wheat, and means whereby the air and dust are separated from the heavier material or screenings and the latter discharged into a suitable receptacle while the air and dust are forced out or into a dust collector.

2. In a wheat cleaning apparatus, means for scouring and removing the outer coating of bran and crease dirt or other impurities from the wheat, comprising a cylindrical casing, a shaft journaled in said casing and having fixed thereon a series of scourer arms and carrier flights alternating with said arms, said scourer arms having no conveying tendency but adapted to remove from the wheat the outer coating of bran and crease dirt while the carrier flights are adapted to force the wheat toward the discharge end of the casing, and means for separating the cleaned wheat from the bran and impurities, together with means for separating the heavier particles or screenings from the air and dust and forcing the dust-laden air into a dust collector.

3. In a wheat cleaning apparatus, means for scouring and removing the outer coating of bran and cerase dirt or other impurities from the wheat, comprising a cylindrical casing, a shaft journaled in said casing and having fixed thereon a series of scourer arms and carrier flights alternating with said arms, said scourer arms having no conveying tendency but adapted to remove from the wheat the outer coating of bran and crease dirt while the carrier flights are adapted to force the wheat toward the discharge end of the casing, means for varying the resistance encountered by the wheat as it is forced toward the discharge end of the casing, and means for separating the cleaned wheat from the bran and impurities, together with means for separating the heavier particles or screenings from the air and dust and forcing the dust-laden air into a dust collector.

4. In a wheat cleaning apparatus, means for scouring and removing the outer coating of bran and crease dirt from the wheat, comprising a cylindrical casing, a shaft journaled in said casing having fixed thereon a series of scourer arms and carrier flights alternating with said arms, said scourer arms having no conveying tendency but adapted to remove the outer coating of bran and crease dirt from the wheat while the carrier flights are adapted to force the wheat toward the discharge end of the casing and aid in the cleaning process, means at the delivery end of the scourer-case for exerting a variable resistance to the passage of the wheat therethrough, and means for separating the cleaned wheat from the bran, dust and impurities, the latter means comprising a rotary fan adapted by suction to separate the bran and impurities from the wheat and allow the latter to descend by gravity into a suitable receptacle, and means whereby the screenings are separated by gravity from the dust and air and the dust-laden air forced out into a dust collector, together with means for intermittently discharging the screenings by force of gravity against a retaining force exerted by the suction of the fan.

5. In an apparatus for cleaning wheat, a plurality of spiral conveyors enclosed in suitable casings through which the wheat is caused to pass successively in a serpentine or forward and back course, said casings being adapted to contain water, and a cleaning device into which the wheat is discharged from said conveyors, said device comprising a cylindrical casing having a shaft journaled therein in the axial line thereof, said shaft having a series of radial arms secured thereon for rubbing and scouring the wheat in its passage through said casing but unadapted to exert any conveying tendency; said arms being round and tapering and decreasing in cross-sectional area toward but enlarged at their free ends, and a series of carrier flights alternating with said arms and extending substantially at right angles thereto; said flights having flat surfaces inclined at an angle to said shaft and adapted to force the wheat toward the discharge end of the casing.

6. In an apparatus for cleaning wheat, means for wetting and conveying the wheat to a cleaning device, comprising a plurality of spiral conveyors enclosed in tubular liquid containing casings through which the wheat is caused to pass successively in a serpentine or forward and back course, and a cleaning device into which the wheat is discharged from the last of said conveyors, said device comprising an oblong casing having a shaft journaled therein in the axial line thereof, said shaft having a series of radially projecting round and tapering arms with ball-shaped ends adapted to stir, rub and scour the wheat as it is forced through said casing but unadapted to exert any conveying tendency, and a series of carrier flights alternating with said arms; said flights projecting substantially at right angles to said arms and having flat oppositely inclined surfaces and adapted to force the wheat toward the discharge end of the casing.

7. In an apparatus for cleaning wheat, a cylindrical casing, a shaft extending through said casing in the axial line thereof and carrying a series of radially projecting carrier flights, and a series of radially projecting rubbing and scouring arms fixed on said shaft and alternating with said carrier flights, said arms having enlarged and rounded inner end portions and tapering toward their free ends, said free ends being enlarged and rounded and arranged in close proximity to the inner surface of the cylinder, and said flights being flat and arranged at an angle to the shaft so as to force the material toward the discharge end of the casing.

8. Means for wetting wheat and delivering it to a cleaning device, comprising spiral conveyors enclosed in casings adapted to contain water, in combination with a cleaning device comprising a casing containing a shaft carrying a series of radially projecting scourer arms and radially projecting carrier flights alternating with said arms, said flights being flat and inclined at an angle to said shaft and adapted to force the material toward the discharge end of the casing, and said arms being round and tapering toward their free ends which are slightly enlarged, whereby they are adapted to rub and scour the wheat without effecting an onward movement, a discharge opening at one end of said casing and a door closing said opening having a weight acting thereon for varying the resistance encountered by the material as it is forced by said flights toward said opening.

9. An apparatus of the character described comprising water-containing casings enclosing spiral conveyors by which the grain is moved back and forth through said casings and delivered to a cleaning device; said cleaning device comprising an oblong casing having therein a shaft carrying a series of scourer arms and carrier flights arranged between said arms; said flights projecting from said shaft substantially at right angles to said arms and having flat inclined surfaces, whereby they are adapted to force the grain toward the discharge end of the casing; said arms being round and tapering toward their free ends, which are of ball-shaped form, whereby they are adapted to stir, rub and scour the grain as it is moved forward by said flights; said casing having a discharge opening at its delivery end, and means for yieldingly closing said opening.

10. An apparatus of the character described comprising a series of casings adapted to contain water, the uppermost one in the series having a wheat inlet at one end and the lowermost one having a wheat outlet at the end thereof remote from said inlet, spiral conveyors in said casings whereby the wheat is forced therethrough in a serpentine course from said inlet to said outlet, a scourer-case arranged below said conveyor casings into which the wetted wheat is discharged, a shaft journaled in said case carrying a series of radially projecting arms unadapted to exert any conveying tendency, and a series of radially projecting carrier flights alternating with said arms; said flights being flat-faced and arranged at an angle to the shaft, so as to adapt them to force the material toward the discharge end of the scourer-case while said arms stir, rub and scour the wheat, and variable pressure-resisting means at the delivery end of the scourer-case for retarding the flow of wheat therethrough and increasing the friction between the grains of wheat and between the wheat and the stirrer arms and flights.

11. The combination, in a wheat cleaning apparatus, of a series of water-containing casings having revolubly fitted therein a series of spiral conveyors, an inlet being provided at one end of the uppermost casing and an outlet at the opposite end of the lowermost casing, a scourer-case arranged below said series of casings and connected by a down spout with said outlet, a shaft journaled in said case carrying a series of radially projecting scourer arms and a series of radially projecting carrier flights alternating with said arms; said flights being flat faced and arranged at an angle to the shaft, and said arms being rounded and tapering toward their free ends and having no conveying tendency but adapted to stir up, rub and scour the wheat as it is moved forward by said flights.

12. The combination with a wheat cleaning device of means for separating the cleaned wheat from the bran, dust and impurities, and means for separating the heavier particles or screenings from the bran and dust-laden air, comprising an air chamber having a suction fan therein, a draft leg connecting said chamber with said cleaning device so that the cleaned wheat is discharged by gravity into said draft leg against an ascending current of air while the bran, dust and impurities are drawn up into said air chamber; said chamber having a depending leg into which the heavier particles or screenings are discharged by gravity, and a passage controlled by a non-return valve through which the bran and dust-laden air are drawn while the screenings fall into said depending leg, the latter being provided with a discharge outlet and a valve for closing said outlet, the pressure of accumulated screenings being adapted to open said valve intermittently and permit the screenings to be discharged.

In testimony whereof I affix my signature.

JAMES GEORGE CHALMERS.